Figures 1, 2:
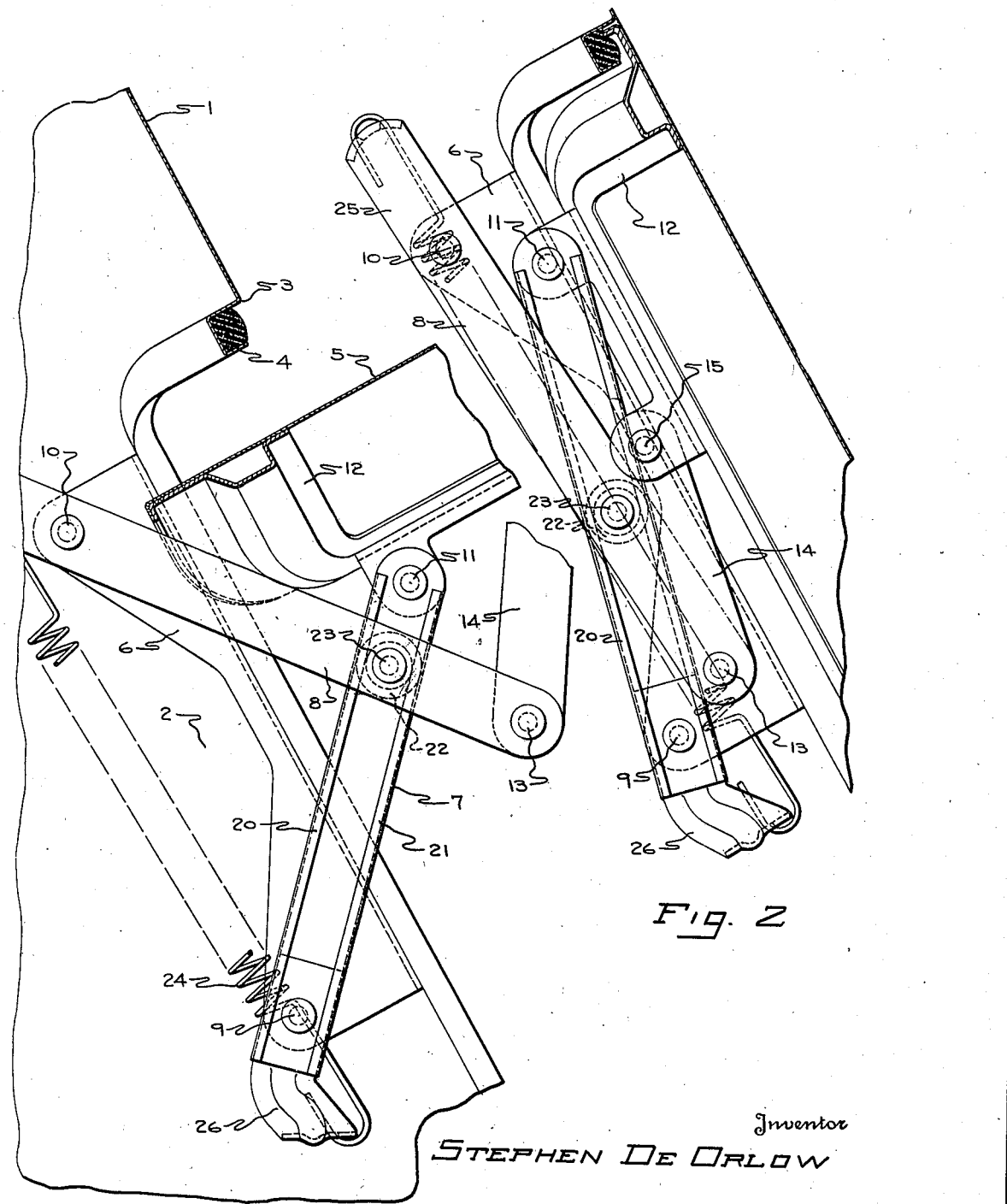

April 27, 1943.  S. DE ORLOW  2,317,892
HINGE STRUCTURE
Original Filed Nov. 22, 1937  2 Sheets-Sheet 1

Inventor
STEPHEN DE ORLOW
By Beaman & Langford
Attorneys

April 27, 1943.   S. DE ORLOW   2,317,892
HINGE STRUCTURE
Original Filed Nov. 22, 1937   2 Sheets-Sheet 2
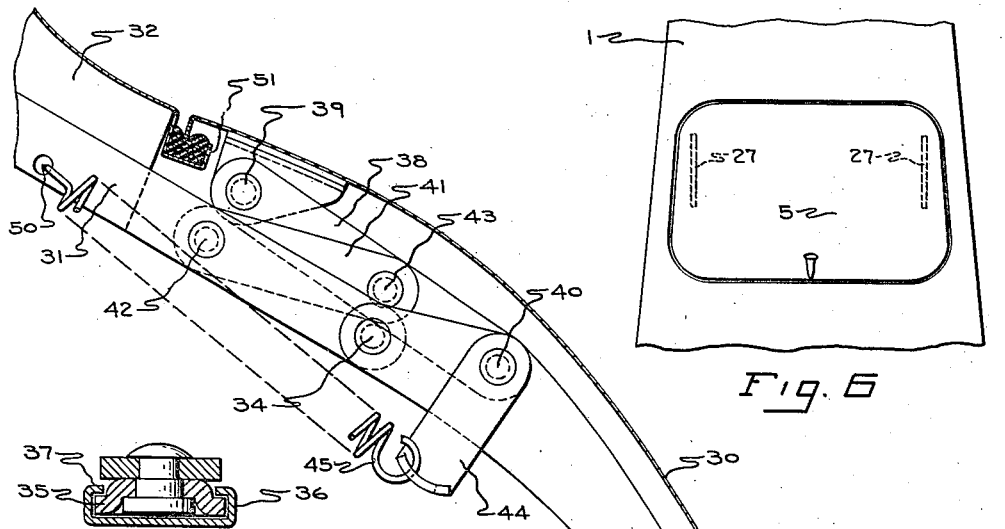
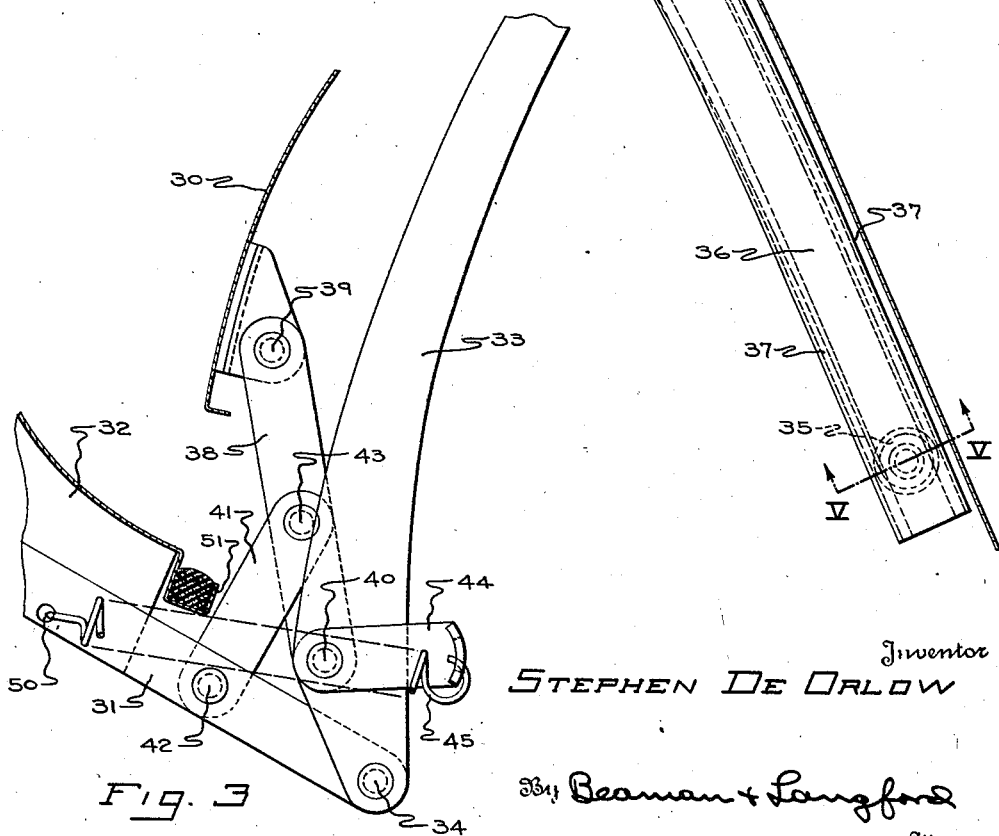
Inventor
STEPHEN DE ORLOW
By Beaman + Langford
Attorneys Patented Apr. 27, 1943

2,317,892

UNITED STATES PATENT OFFICE 2,317,892

HINGE STRUCTURE

Stephen De Orlow, Detroit, Mich., assignor to Hancock Manufacturing Company, Jackson, Mich., a corporation of Michigan Original application November 22, 1937, Serial No. 175,767, now Patent No. 2,258,065, dated October 7, 1941. Divided and this application September 9, 1940, Serial No. 355,949

3 Claims. (Cl. 16—163)

The present invention relates to improvements in hinge structures for swinging structure, such as the hoods and compartment covers for automobiles, as well as windows, hatches, and the covers and lids of compartments in general. Hinge structures of the type hereinafter disclosed are particularly useful in connection with the hinged covers of automobiles and the like which are a part of the body and are usually of complex contour, as for example, the hood for the engine and the cover for the usual rear compartment. This application is a division of my co-pending application Serial No. 175,767, filed November 22, 1937, which has matured into Patent No. 2,258,065 of October 7, 1941.

An object of the invention is to provide a novel hinge structure of the type permitting the hinged part to have other than pivotal or swinging movement about a fixed axis.

Another object is to provide a hinge structure permitting bodily movement of the hinged part in addition to a pivotal or swinging movement, the same being simple in its construction and operation.

A further object resides in a hinge structure as aforesaid in which a novel arrangement is provided for counterbalancing, urging, or supporting the hinged part into open position.

These and other objects residing in the combination, construction and arrangement of the parts providing for the desired compound movement characterizing a hinge structure will be apparent from the following specification when taken with the accompanying drawings, in which:

Fig. 1 is a cross-sectional view showing one form of hinge structure used in connection with the rear cover of an automobile compartment, showing the cover in full open position, Fig. 2 is a view of the cover and hinge of Fig. 1 in closed position, Figs. 3 and 4 are views similar to Figs. 1 and 2 disclosing another form of the invention, Fig. 5 is a cross-sectional view taken through a part of the hinge structure on the line V—V of Fig. 4, and Fig. 6 is a fragmentary elevational view of the rear end of an automobile showing the relation of the hinge structure to the cover.

In the drawings three different forms of the invention have been illustrated in connection with the cover or closure for the built in compartment at the rear of an automobile. While the principles of operation of my improved hinges are particularly adaptable to such constructions, the disclosure of the invention in connection with automobile closures is merely illustrative and is not to be taken as limiting the scope of the invention and its contemplated field of usefulness.

Referring to Figs. 1 and 2 of the drawings, the reference character 1 indicates the rear of an automobile having a compartment 2, access to which is afforded through an opening 3 defined by a channel 4 into which a closure or cover 5 is fitted. A plate 6 fixed to the underside and adjacent the sides of the opening defined by the channel 4 has pivotal connections with the links 7 and 8 at 9 and 10, respectively. The link 7 has a pivotal connection 11 with a reinforcing channel 12 fixed to the underside of the cover 5. Pivoted to link 8 at 13 is a second link 14 having a pivotal connection with the channel 12 at 15. The link 7 is of U-section with inturned flanges 20 and 21 to provide a track for a roller 22 carried by a rivet 23 secured to the link 8. Through this interlocking arrangement between the links 7 and 8 positive predefined hinging movement of the cover 5 is provided.

The cover 5 is manipulated by lifting the outer end thereof and pivoting it about the links 7 and 8. Upon initial lifting of the cover 5, the same moves bodily away from the opening which it closes and is shifted so as to permit it to swing about the pivotal connection 11 without interfering with the channel 4. It will be understood that the rate of pivotal movement of the cover 5 increases as the roller 22 approaches the pivotal connection 11.

To impart to the link members 8 and 14 the function of a supporting prop for the cover 5, a coil spring 24 is tensioned between points of anchorage upon the tail 25 of the link 8 and the tail 26 of the link 7. As shown in Fig. 2, with the cover 5 closed the line of action of the spring is above the pivotal connection 10 thus having a tendency to hold the cover 5 closed. However, upon lifting the cover 5, the spring 24 is swung below the pivotal connection 10 and functions to extend the linkage constituted by the links 7 and 14 to support the cover 5 in open position. The hinges 27, shown in Fig. 6, constituted by the links 7, 8 and 14, are disclosed in their relative positions to the body 1 and the cover 5 in Fig. 6.

In Figs. 3, 4 and 5 another form of the invention is disclosed, which in general embodies the principles of hinging and propping disclosed in the form shown in Figs. 1 and 2. The cover 30 is hinged from a bracket 31 carried by the compartment 32. The hinge comprises a prop member 33 having a pivotal connection with the bracket 31 at 34. A roller 35 is provided on the prop 33 which traverses in a track 36 of U-section, fixed to the cover 30, with inturned edges 37 similar to the construction of the link 7 of Fig. 1. A link 38 has pivotal connections at 39 with the cover 30 and at 40 with the prop 33. Another link 41 is provided between the bracket 31 and the link 38 having pivotal connections at 42 and 43. Rigid with the prop 33 is an offset spring anchorage 44 to which the coil spring 45 is attached at one end, the spring being attached to the bracket 31 at 50 at the other end. In the closed position the action of the spring 45 is below the pivotal connection 34 holding the cover 30 to its seat in the compartment opening defining channel 51. When the cover 30 is lifted the spring action is above the pivotal connection 34 and the prop 33 holds the cover 30 in its raised position. It will be understood that the roller 35 traverses the track 36 as the prop 33 is sprung counter-clockwise to open. A stop 52 limits the open position of the cover 30 through abutment with the roller 35.

It is to be understood that in manipulating the cover 30, the front thereof is raised with the result that the cover is pivoted around the link members to initially lift the cover bodily from its sealing engagement with the sealing cushion supported by the channel 51 and then is pivoted to open position as shown in Fig. 3. In both forms of the invention the propping spring will serve to resiliently hold the cover open and also to resiliently hold the cover shut.

Each of the illustrated forms of the invention may be considered concealed hinge structure. In automobile body design it is the usual practice to have the closure or cover flush with the body contour as shown in Figs. 2 and 4. It will be appreciated that the hinge action of the present invention is well adapted for swinging the cover into and out of the recess in which it is disposed when closed. I also wish it to be understood that my hinge structure is equally desirable with flat covers as with curvilinear. Moreover, where the cover is not narrowed at the top so as to be capable of being tilted into the opening as shown in Fig. 1, it is only necessary to select the proper length for the links and the location of the pivotal connections so that the upper edge or that edge adjacent the hinging line will entirely clear the opening defining structure.

In the foregoing description, the extensible and collapsible links which serve as props for the cover have in some cases been described as consisting of a plurality of link members. For example, in Figs. 1 and 2, the links 8 and 14 constitute an extensible and collapsible linkage. In the appended claims the term extensible and collapsible linkage or linkage variable overall dimension is intended to cover all constructions of such characteristics regardless of whether they comprise one or more of what might be termed link members or the equivalent. I wish to claim broadly a hinge structure comprising a swinging linkage of fixed dimension and a linkage of variable dimension which may take numerous forms and shapes within the scope of the present invention as will be well understood by those skilled in the art.

Having described my invention, what I claim and desire to protect by Letters Patent is:

1. A hinge structure for a pair of hinged parts comprising a first link, means pivotally connecting the ends of said link to said parts respectively, a second link, means pivotally connecting the ends of said second link to one of said parts and to said first link respectively, a third link, means pivotally connecting the ends of said third link to the other part and to a point intermediate the ends of said second link respectively, at least one of the pivotal connecting means which is connected to said one part including means which allows sliding movement of the corresponding pivotal connecting means.

2. A hinge structure for a pair of hinged parts comprising a first link, means pivotally connecting the ends of said link to said parts respectively, a second link, means pivotally connecting the ends of said second link to one of said parts and to said first link respectively, a third link, and means pivotally connecting the ends of said third link to the other part and to a point intermediate the ends of said second link respectively, at least one of said pivotal connecting means including means allowing sliding movement of the corresponding pivotal connecting means.

3. A hinge structure for a pair of hinged parts comprising a first link, means pivotally connecting the ends of said link to said parts respectively, a second link, means pivotally connecting the ends of said second link to one of said parts and to said first link respectively, a third link, and means pivotally connecting the ends of said third link to the other part and to a point intermediate the ends of said second link respectively, the pivotal connection between the end of said first link and said one part being arranged to allow sliding movement in addition to the said pivotal movement.

STEPHEN DE ORLOW.